(12) United States Patent
Storz et al.

(10) Patent No.: US 7,059,439 B2
(45) Date of Patent: Jun. 13, 2006

(54) EXHAUST GAS ARRANGEMENT FOR A MOTOR VEHICLE

(75) Inventors: Eberhard Storz, Kirchheim (DE); Markus Keller, Leonberg-Höfingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 139 days.

(21) Appl. No.: 10/725,437

(22) Filed: Dec. 3, 2003

(65) Prior Publication Data

US 2004/0108152 A1 Jun. 10, 2004

(30) Foreign Application Priority Data

Dec. 7, 2002 (DE) ................. 102 57 299

(51) Int. Cl.
*B60K 13/02* (2006.01)
(52) U.S. Cl. .................... 180/68.1; 180/68.2; 180/68.3
(58) Field of Classification Search ............... 180/68.1, 180/68.2, 68.3
See application file for complete search history.

(56) References Cited

U.S. PATENT DOCUMENTS

| 4,354,570 A | 10/1982 | Tanaka et al. | |
| 4,533,012 A | 8/1985 | Komoda | |
| 5,251,712 A * | 10/1993 | Hayashi et al. | 180/68.3 |
| 6,471,558 B1 * | 10/2002 | Nakatsuji et al. | 440/88 R |
| 2002/0134598 A1 * | 9/2002 | Nakamura et al. | 180/68.1 |

FOREIGN PATENT DOCUMENTS

| CH | 337365 A | 3/1959 |
| DE | 9202785 U1 | 6/1992 |
| GB | 2110174 A | 6/1983 |
| JP | 54148922 A | 11/1979 |
| JP | 07243357 A | 9/1995 |
| JP | 10213033 A | 8/1998 |
| JP | 2001221113 A | 8/2001 |
| JP | 2002211252 A | 7/2002 |

* cited by examiner

*Primary Examiner*—Christopher P. Ellis
*Assistant Examiner*—John Walters
(74) *Attorney, Agent, or Firm*—Crowell & Moring LLP

(57) ABSTRACT

A device for precluding induction of impurities with raw air inducted into an internal combustion engine, wherein at least one air intake stub of an air filter container draws air from an air accumulation chamber which is sealed off on the front side by a front end covering and on the back side by a convex separating partition adjacent to the engine chamber, and which contains at least one air intake opening located in the floor area of the partition which communicates with air intake openings in the front end of the motor vehicle.

12 Claims, 3 Drawing Sheets

EXHAUST GAS ARRANGEMENT FOR A MOTOR VEHICLE

BACKGROUND AND SUMMARY OF THE INVENTION

The invention relates to a device for the induction of raw air for an internal combustion engine without induction of impurities.

Particularly for all-terrain vehicles, there has arisen the problem that the air for combustion that is sucked in from the outside when traveling overland, contaminated with dirty water, snow, sand and similar foreign objects or material is pulled into an air filter. Because of this, it becomes more difficult to supply raw air to the air filter or the air filter may become clogged.

As the solution to this problem, according to the invention, there is provided a device, which avoids these drawbacks and raw air free from contaminants can be supplied to the air filter container.

This is achieved in accordance with the present invention by a device for induction of raw air for an internal combustion engine by way of an air filter placed in a container that is located in the front end of a motor vehicle, wherein at least one air intake stub of an air filter container draws air from an air accumulation chamber which is sealed off on the front side by a front end covering and on the back side by a convex separating partition adjacent to the engine chamber, and which contains at least one air intake opening located in the floor area of the partition which communicates with air intake openings in the front end of the motor vehicle.

The main advantages achieved with the invention consist in the fact that, by way of the sealed off air accumulation chamber, a removal of water, snow and the like takes place, so that only pure raw air is drawn into an air intake stub of an air filter container. This is achieved in that at least one air intake stub of an air filter container in draws air from one sealed off air accumulation chamber of the device, which is sealed off on the front side by a front end covering and, on the back side, by a separating partition that is convex in relation to and adjacent to the engine chamber. In this partition, in the area of the floor, there is provided at least one air intake opening, which is connected with the air intake openings in the front end of the motor vehicle.

In particular, the air intake stubs are each surrounded, on the free end, by an elastic form piece, which is placed tightly adjacent to the convex separating partition and to a front end covering. This results in a sealing off of the air accumulation area facing the engine chamber, so that the air that is fed in can be completely conveyed to the air filter container.

So that supply of air will reach the air accumulation chamber without significant losses, the air intake openings in the separating partition are placed immediately adjacent to the air intake openings in the front end of the vehicle. Furthermore, according to the invention, it is provided that the convex separating partition is placed with a tangential plane at an acute angle to the horizontal plane of the vehicle and that the air intake openings—in relation to direction of travel—are placed in the front area of the separating partition or on the floor of the separating partition, and with a height distance in immediate proximity to the outlet opening of the air intake stub. In this way, the impurities are separated out and precipitate in the low area of the space, because the outlet opening of the air intake stub or the air intake stubs is/are placed higher that the air intake openings in the separating partition. At the same time, the outer surface of the convex separating partition of the sealed off air accumulation chamber can be used as the air conveying surface for cool air to a cooling module.

The air intake openings may be equipped with a screen, a valve or the like, so that significant impurities in the air that is fed in can be filtered out, precipitated or held back even at the beginning.

DETAILED DESCRIPTION OF THE DRAWINGS

Figure 1:
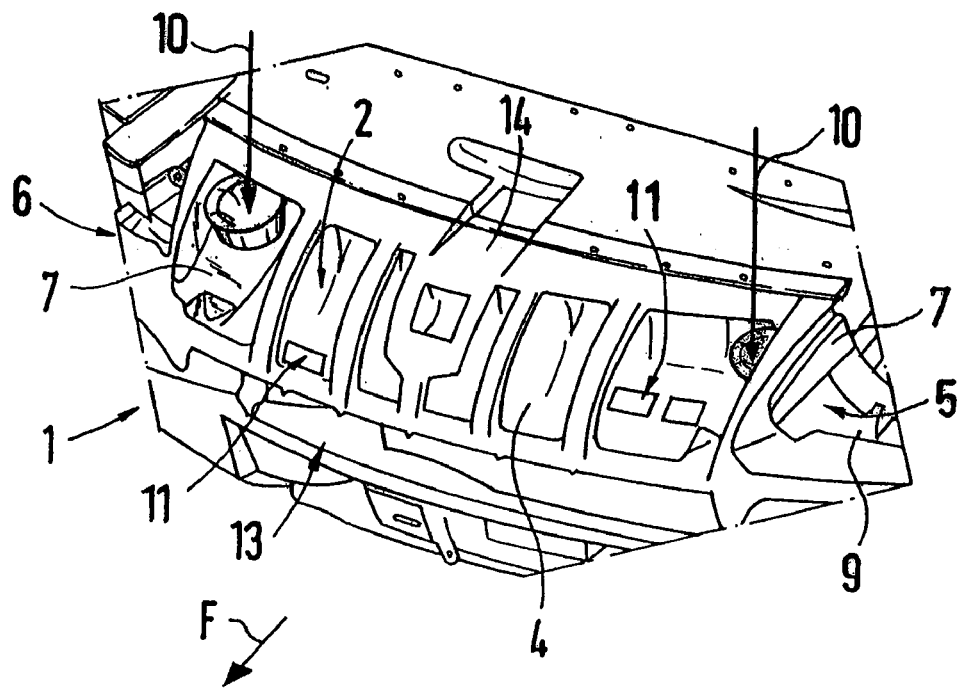
FIG. 1 shows a diagrammatic representation of an accumulation chamber, leaving out the front end covering with air intake stub in accordance with one embodiment of the present invention.

In one embodiment of the present invention, in front end 1 of a motor vehicle, there is placed sealed off air accumulation chamber 2, which is tightly closed off on the outside by a front end covering 3, on the inside by a convex separating partition 4 and on both front sides 5, 6 by an elastic form piece 7 with respect to the engine chamber.

Figure 2:
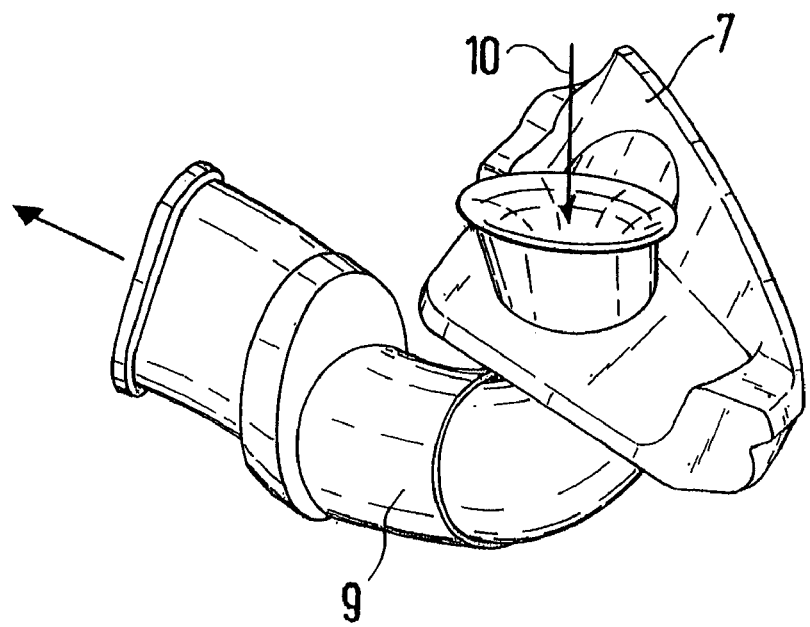
FIG. 2 shows a diagrammatic representation of an air intake stub of an air filter container connected with an elastic form piece in the accumulation chamber illustrated in FIG. 1.

In air accumulation chamber 2 there is at least one air intake stub 9 for raw air 10 of an air filter container, which is held in form piece 7 and tightly closed in on the end side, as shown in greater detail by FIG. 2.

Figure 4:
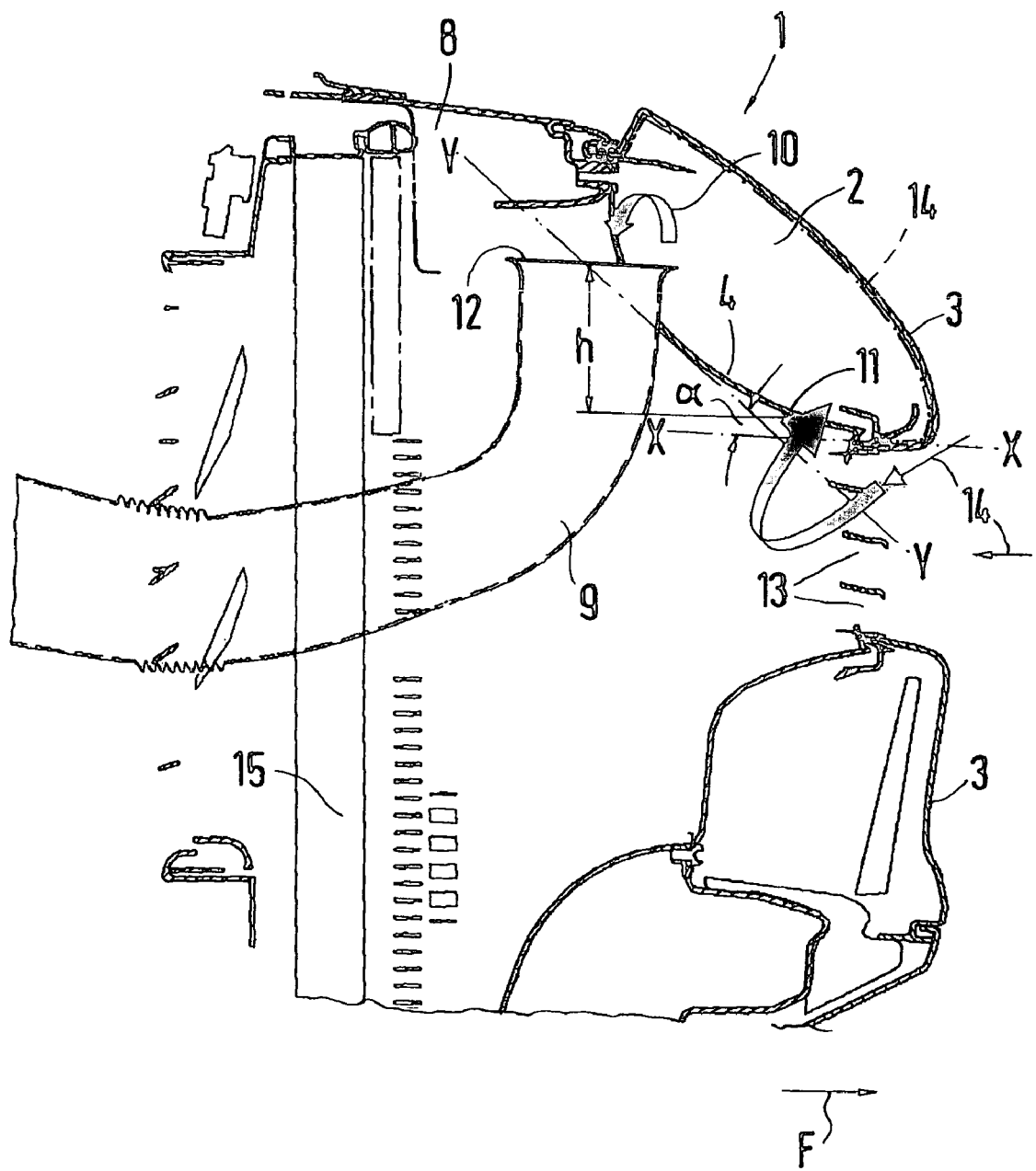

Separating partition 4 is designed to be convex and oriented inward in relation to engine chamber 8 and a tangential plane Y—Y of separating partition 4 is positioned at an acute angle α to horizontal plane X—X of the motor vehicle, as shown in FIG. 4.

In separating partition 4 there are provided—in relation to the direction of travel F—at least in the front area of separating partition 4, air intake openings 11. These are placed with a height distance h and adjacent to outlet opening 12 of air intake stub 9 for raw air. In forward section piece 3 there are provided air intake openings 13, which convey air flow 14 to air intake openings 11 of separating partition 4 into air accumulation chamber 2.

In FIG. 1, this space 2 is showed in greater detail in diagrammatic representation, and to hold front end covering 3, there is provided a grating-shaped bearing part 4, which, however, is completely covered by front end covering 3.

The air flow 14 entering through air intake openings 13 also opens up cooler module 15, which, in relation to the direction of travel F—is placed behind air accumulation chamber 2, while the convex separating partition 4 serves as an air-conveying surface.

Air intake openings 11 and/or outlet openings 12 may also be covered by screens, valves or other similar means, so that snow, sand, water and other kinds of foreign material cannot get into space 2 or can get in only partially.

Figure 3:
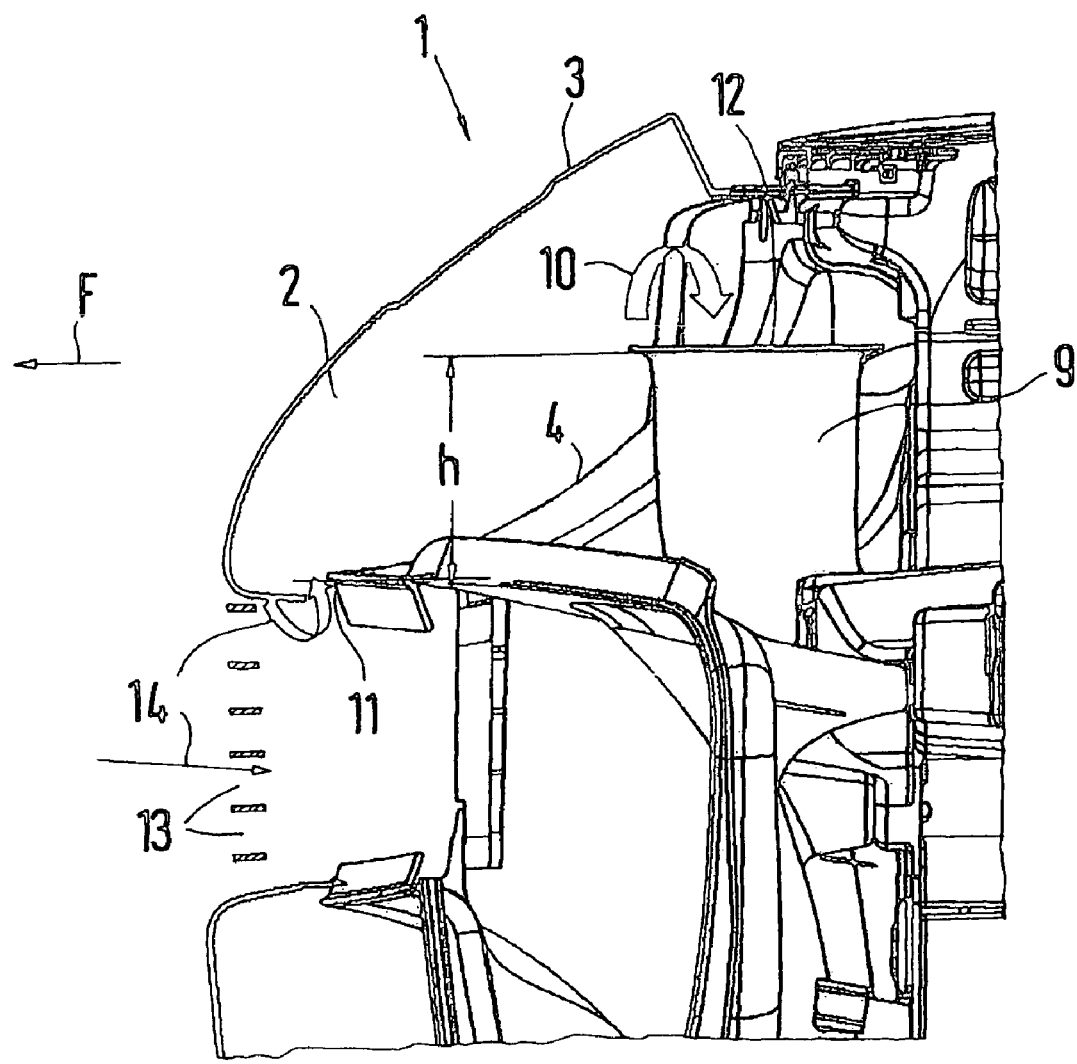
FIG. 3 shows a cross-section through the air accumulation chamber of FIG. 1 placed in the front end of the motor vehicle and FIG. 4 shows an additional cross-section through the air accumulation chamber of FIG. 1 with air intake stub and cooler module.

As can be seen, especially in FIG. 3 and FIG. 4, air 14 flows in by way of air intake openings 13 in front end 1 of the motor vehicle, and a partial airflow flows to cooler module 15 and an additional partial airflow flows through air intake openings 11 into air accumulation chamber 2, as shown by the arrows. The foreign bodies or foreign material, for example, which had been drawn in along, while traveling overland, are separated off, precipitated and caught, on account of outlet openings 12 of air intake stub 9 positioned higher than air intake openings 11, and therefore do not get into the air filter container.

The invention claimed is:

1. An apparatus for air induction into a vehicle internal combustion engine, comprising:
   at least one air intake stub tube with an intake end and an engine air filter container end; and
   an air accumulation chamber located at a front end of the vehicle,
   wherein
   a front side of the air accumulation chamber is formed by a front end covering of the vehicle,
   a back side of the air accumulation chamber is formed by a convex separating partition adjacent to an engine chamber of the vehicle, the convex separating partition including at least one accumulation chamber air inlet, located in a floor area of the partition which receives air from at least one air intake opening at the front of the vehicle, and
   the at least one air intake stub tube draws air from the air accumulation chamber through the stub tube intake end, and
   a tangential plane of the convex separating partition is transverse to a longitudinal axis of the vehicle and is at an acute angle to a horizontal plane of the vehicle, and the at least one accumulation chamber air intake opening in the floor area of the separating partition is below the intake end of the at least one stub tube.

2. The air induction apparatus according to claim 1, wherein the stub tube intake end protrudes into the air accumulation chamber, adjacent to an elastic form piece sealing an end of the air accumulation chamber between the convex separating partition and the front end covering.

3. The air induction apparatus according to claim 1, wherein the at least one accumulation chamber air intake opening, is located adjacent to the at least one air inlet opening at the front of the vehicle.

4. The air induction apparatus according to claim 2, wherein the at least one accumulation chamber air intake opening, is located adjacent to the at least one air inlet opening at the front of the vehicle.

5. The air induction apparatus according to claim 1, wherein an outside surface of the convex separating partition is used as an air conveying surface to cool air provided to a cooler module.

6. The air induction apparatus according to claim 1, wherein the at least one accumulation chamber air intake opening, in the separating partition is covered with at least one of a filter and a swiveling valve.

7. The air induction apparatus according to claim 2, wherein an outside surface of the convex separating partition is used as an air conveying surface to cool air provided to a cooler module.

8. The air induction apparatus according to claim 2, wherein the at least one accumulation chamber air intake opening, in the separating partition is covered with at least one of a filter and a swiveling valve.

9. The air induction apparatus according to claim 3, wherein an outside surface of the convex separating partition is used as an air conveying surface to cool air provided to a cooler module.

10. The air induction apparatus according to claim 3, wherein the at least one accumulation chamber air intake opening, in the separating partition is covered with at least one of a filter and a swiveling valve.

11. The air induction apparatus according to claim 4, wherein an outside surface of the convex separating partition is used as an air conveying surface to cool air provided to a cooler module.

12. The air induction apparatus according to claim 4, wherein the at least one accumulation chamber air intake opening, in the separating partition is covered with at least one of a filter and a swiveling valve.

* * * * *